June 10, 1941.  D. C. DRILL  2,245,392
VARIABLE SPEED TRANSMISSION
Filed Dec. 19, 1938  6 Sheets-Sheet 1
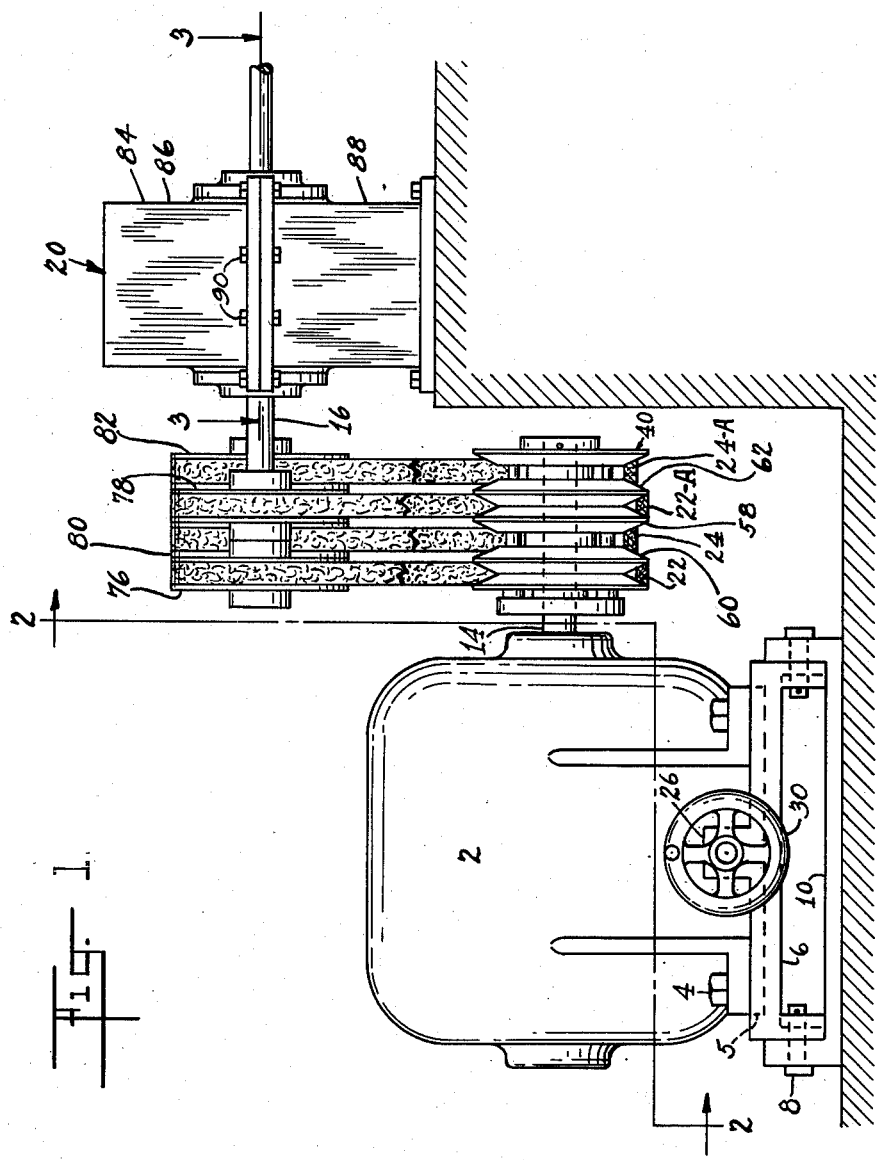
Daniel C. Drill
INVENTOR.
BY Carlton C. Davis
ATTORNEY.

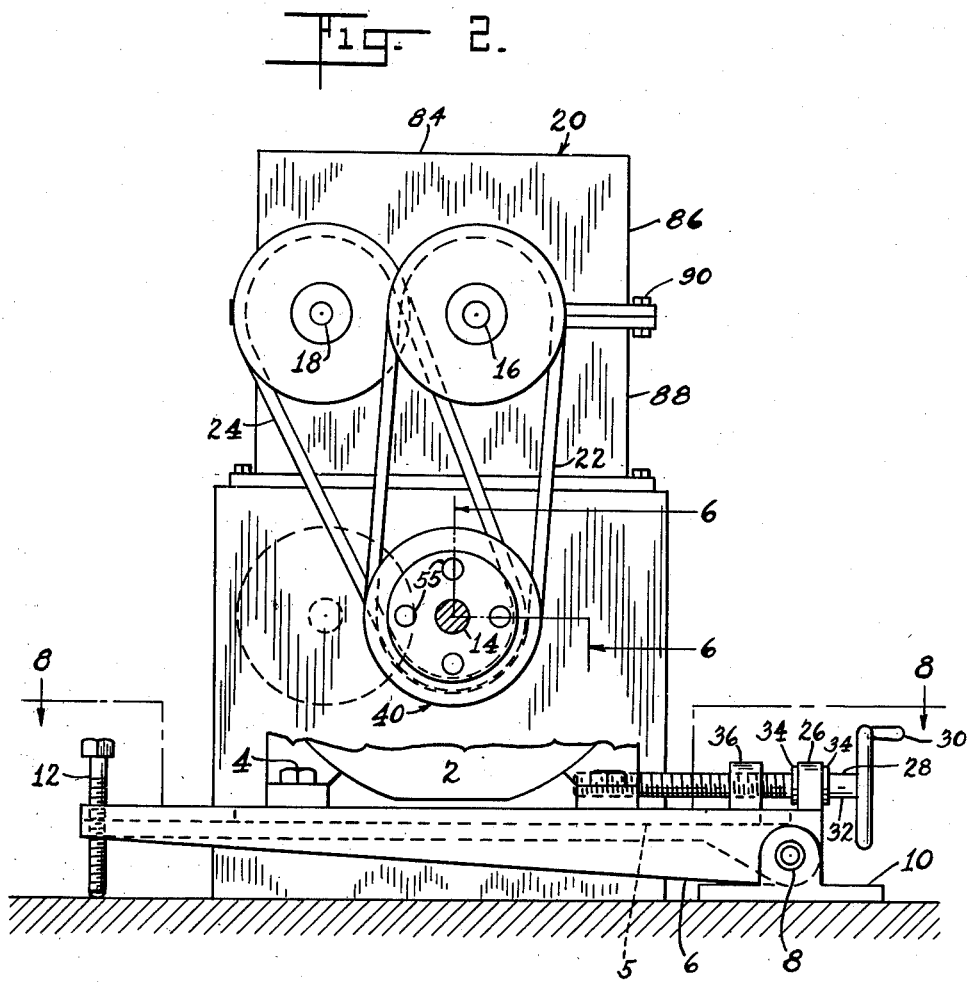

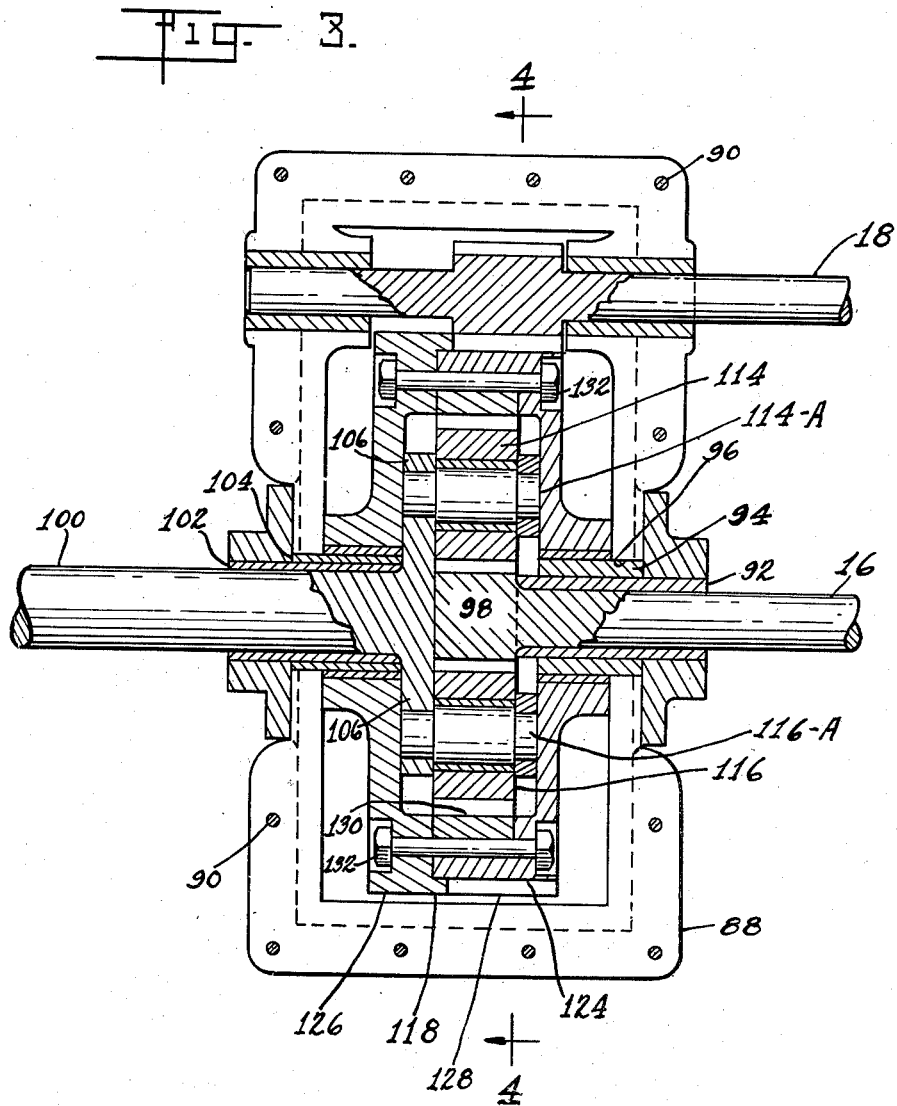
Daniel C. Drill
INVENTOR.
BY Carlton C. Davis
ATTORNEY.

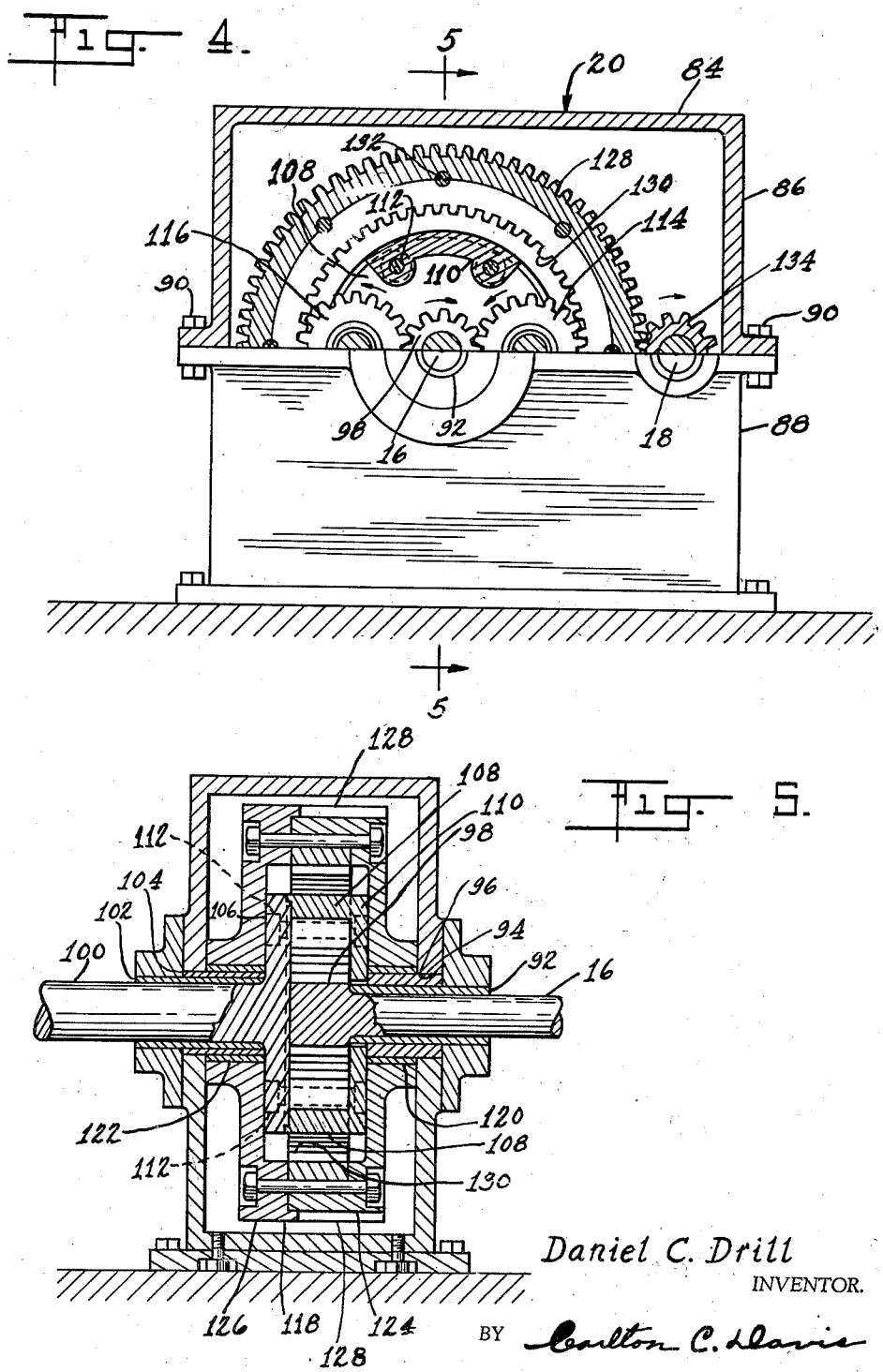

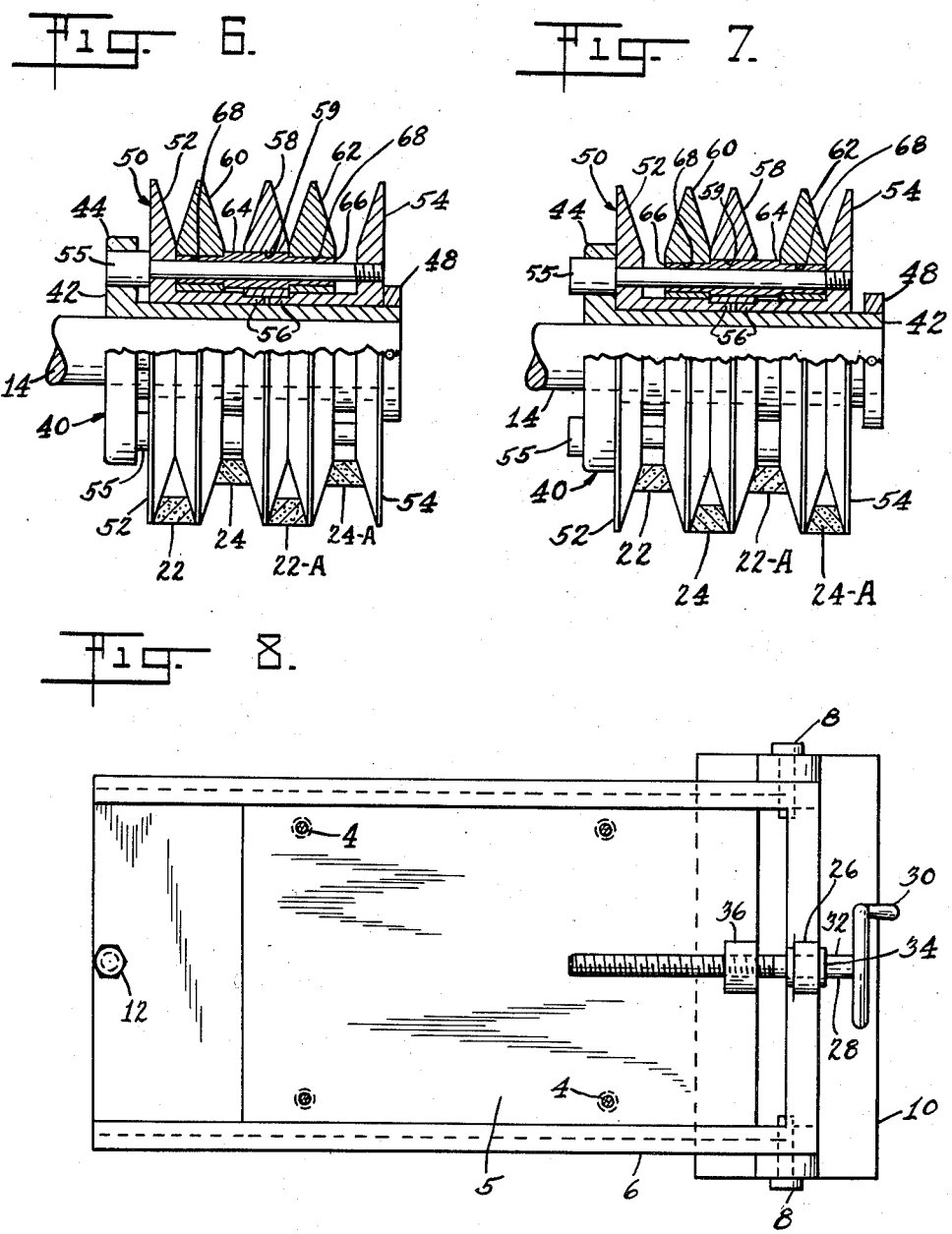

June 10, 1941.  D. C. DRILL  2,245,392
VARIABLE SPEED TRANSMISSION
Filed Dec. 19, 1938  6 Sheets-Sheet 6

Daniel C. Drill
INVENTOR.

BY Carlton C. Davis
ATTORNEY.

Patented June 10, 1941

2,245,392

UNITED STATES PATENT OFFICE 2,245,392

VARIABLE SPEED TRANSMISSION

Daniel C. Drill, Wabash, Ind., assignor to American Rock Wool Corporation, Wabash, Ind., a corporation of Indiana Application December 19, 1938, Serial No. 246,550

6 Claims. (Cl. 74—286)

This invention relates to a variable speed transmission of that type permitting, within wide limits, of infinite variations of speed. It also relates to a transmission of the class described which is adapted to reverse the direction of the driven shaft while the main input power shaft is being driven in one direction.

In so far as is known by the applicant, all belt driven variable speed transmissions of the prior art have a substantially constant output torque which is limited by the amount of the friction between the driving belt or belts and the pulleys when said driving belt or belts are being driven at efficient speeds. The power output of said prior art transmissions is, therefore, dependent upon the size and speed of the variable speed transmission belt or belts.

One of the objects of my invention is to provide a novel variable speed transmission which is adapted to supply a much more nearly constant power output at widely varying speeds than is possible to obtain with any of the said transmissions of the prior art.

A further object of this invention is to provide a variable speed transmission which has an extremely simple rugged and economical construction.

Another object is to provide a speed transmission which is adapted to be driven at variable speeds either by a single shaft rotating at a constant speed or by two shafts, one or both of which may be rotated at variable speeds.

A further object of this invention is to provide a mechanism whereby a variable speed may be obtained with minimum power losses.

A further object is the provision of a variable speed transmission having a minimum number of moving parts.

A further object is to provide a speed mechanism of the character described having a drive shaft which may either remain stationary or be driven in either a clockwise or counter-clockwise direction, while the driven shaft of the mechanism is being rotated in one direction at a constant speed.

A yet further object of this invention is to provide a simple pulley and belt mechanism whereby the speed of the driven shaft or shafts may be varied without substantially changing the speed of the driving shaft and without using any gears between the driving shaft and the driven shaft or shafts.

The full nature of this invention and its other objects will be understood from the accompanying drawings and the following description and claims.

In the drawings:

Figure 1 is a side elevational view showing a preferred form of my invention;

Figure 2 is an end elevational view of the same taken along the line 2—2 of Figure 1;

Figure 3 is a section taken along the line 3—3 of Figure 1;

Figure 4 is a partly sectional and partly end elevational view taken along the line 4—4 of Figure 3;

Figure 5 is a section taken along the line 5—5 of Figure 4;

Figure 6 is a section of a self-adjusting pulley means taken along the line 6—6 of Figure 2;

Figure 7 is a similar view of the same pulley means wherein the movable portions of the pulley means are shown shifted in position;

Figure 8 is a plan view taken substantially along the line 8—8 of Figure 2;

Figure 9:
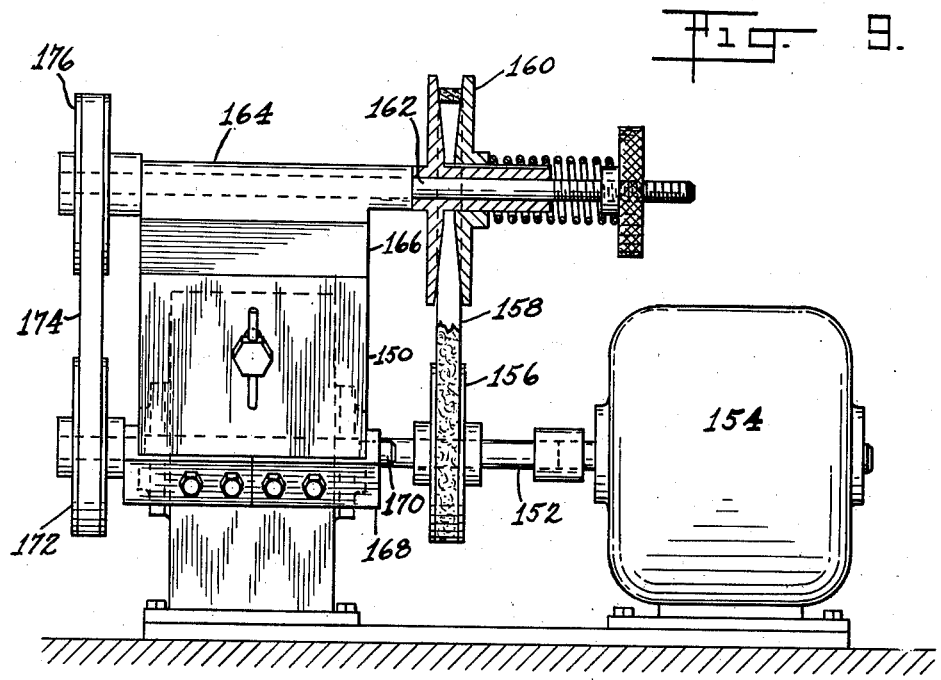
Figure 9 is a side elevational view of a modified form of my invention.

Referring now to Figures 1, 2, 6, 7, and 8, 2 indicates a motor which is secured by any suitable means, such as bolts 4, to a plate 5. This plate is slidably mounted on a platform 6 which is pivotally connected at one of its ends by pins 8 to a base or support 10. The opposite end of the platform 6 is provided with a vertically extending threaded opening, not shown, which is adapted to receive an adjusting screw 12 whereby the platform and the motor 2 may be tilted for the purpose of varying the distance between the center line of the motor shaft 14 and the driven shafts 16 and 18 of a hereinafter to be described variable speed drive mechanism 20. This arrangement provides a very convenient means for adjusting the tension on the V-belts 22 and 22—A and the V-belts 24 and 24—A.

The platform 6 is provided near its pivoted end with a bearing 26 which is adapted to receive an adjusting screw means 28 which includes a hand wheel 30 and a shaft 32 which is threaded substantially as shown. This shaft passes through the bearing 26 but is prevented from moving longitudinally by any suitable means such as, for instance, collars 34.

The slidably mounted plate 5 is provided with an interiorly threaded lug 36 which receives the threaded portion of the shaft 32 for the purpose of permitting the plate 5 to be moved to any desired position on the platform by rotating the adjusting means 28.

It will thus be seen that the motor 2 may be moved either vertically or horizontally with respect to the position of the driven shafts 16 and 18 of the transmission mechanism 20.

The drive shaft 14 of the motor carries a pulley mechanism 40 which is detachably connected to the shaft 14 by any suitable means, not shown. This mechanism provides an extremely convenient means whereby the speed ratio between the driving shaft 14 of the motor and the driven shafts 16 and 18 of the transmission 20 may be varied within the limits of the construction of the pulley mechanism.

The mechanism 40 is provided with an inner sleeve 42 having an integral collar portion 44 at one end and a threadedly connected collar portion 48 at the other end. A sleeve and collar means 50 is slidably mounted on the sleeve 42 between the collar portions 44 and 48. This sleeve and collar means 50 is formed of two half-sections 52 and 54 and these sections are clamped together by a plurality of bolts 55 which are preferably enlarged at one end and threaded at the other end substantially as shown.

The sleeve portions of the half-sections 52 and 54 are each reduced near their inner ends 56 for the purpose of rigidly securing a pulley rim portion 58 when the half-sections 52 and 56 are tightly secured together by the bolts 55.

The sleeve and collar means 50 is provided with two other pulley rim members 60 and 62. The central bore or opening of each of these members is made slightly larger than the corresponding bore or opening of the pulley member 58 for the purpose of permitting each of these members 60 and 62 to slide freely on the sleeve portion of the sleeve and collar means 50. Slidably mounted on each of the bolts 55 is a sleeve member 64 having reduced end portions 66.

The rim member 58 is provided with a plurality of openings 59 which are adapted to slidably receive the enlarged central portions of the sleeves 64, and the rim members 60 and 62 have similar but slightly smaller openings 68 in which the reduced sleeve sections 66 are tightly fitted.

The construction of the pulley mechanism 40 (see Figures 6 and 7) is such that the sleeve and collar means 50 may freely slide upon the inner sleeve 42 which is fixedly secured to the motor shaft 14 and that the pulley rim members 60 and 62 are adapted to slide freely upon the sleeve portions of the sleeve and collar means 50 but that the central pulley member 58 is fixedly secured to the sleeve and collar members.

It will also be noted that the pulley rim members 60 and 62 are fixedly secured in relation to each other and that the sleeve and collar member means 50 and all the members mounted thereon are adapted to slide longitudinally with respect to the sleeve 42 and the motor shaft 14, but are prevented from rotating around the sleeve 42 for the reason that the heads of the bolts 50 are slidably fitted within the integral collar portion 44, which, of course, is rigidly secured to the shaft 14.

The shaft 14 and the pulley mechanism 40 are operatively connected to the shaft 16 of the variable speed drive transmission 40 by means of the V-belts 22 and 22-A which ride upon two spaced-apart V-shaped pulleys 76 and 78 which are fixedly secured to the shaft 16. The shaft 18 of the speed transmission 20 is provided with two other similar spaced-apart V-shaped pulleys 80 and 82 which are fixedly secured to the shaft 18, and these pulleys are driven by belts 24 and 24-A which are driven by the pulley mechanism 40.

The variable speed drive mechanism 20 is provided with any suitable casing 84 which is preferably formed of an upper flanged section 86 and a lower flanged section 88 which are secured together in any suitable manner, such as, for instance, by bolts 90. The power input drive shaft of this mechanism 20 passes into the casing through a preferably bronze bearing 92 fitted on a steel sleeve 94 fixedly secured to the casing within the drive shaft opening 96. The inner end of the drive shaft 16 is provided with a preferably integrally formed gear 98 which serves as the sun gear of the variable speed drive mechanism.

The output shaft 100 of this mechanism passes through an opening in the casing which is in alignment with the opening 96 of the power input shaft 16. A preferably bronze bearing 102 is fitted in this opening within a steel sleeve 104 which may be secured to the casing substantially as shown. The inner end of the output shaft 100 is preferably provided with an integrally formed circular flange 106.

To this flange is fixedly secured a circular plate 108 having two inwardly extending and preferably integrally formed lug portions 110 which are secured to the flange in any suitable manner, such as, for instance, by bolts 112. Gears 114 and 116 (which form the planetary gear of the transmission 20) are rotatably mounted on shafts 114—A and 116—A having reduced end portions which are carried in aligned recesses provided in the flange 106 and in the plate 108. These transmission gears are positioned diametrically opposite each other and are each in meshed relationship with the sun gear 98.

A hollow circular housing 118 is rotatably mounted around the power input shaft 16 and the power output shaft 100 in any suitable manner, such as, for instance, on bronze bearings 120 and 122 which are respectively mounted on the steel sleeves 94 and 104. This housing is preferably formed of two sections, such as, for instance, the sections 124 and 126. The section 124 is provided at its circumference with an external gear 128 and is recessed to receive a circular ring gear member 130 which may be fixedly secured to the section 124 in any suitable manner, such as, for instance, by bolts 132. The teeth of this gear member are in meshed relationship with the planetary gears which are, in turn, in meshed relationship to the sun gear 98.

The driven shaft 18 is provided with a preferably integrally formed gear 134, and this shaft is rotatably mounted in the mechanism casing 84 in such a manner that the gear 134 is in meshed relationship with the teeth of the external gear 128.

From the foregoing description of the details of the various parts of my invention, its operation may be readily understood.

Referring now to Figures 1, 2, 6, and 7, it is to be noted that in the arrangement shown, the V-belts all move in the same direction, and that when the motor is moved from the right to the left, as viewed in Figure 2, the tension on the V-belts 22 and 22—A will be increased, and the tension on the V-belts 24 and 24—A will be diminished. This change in tension shifts the slidably mounted pulley rim members 60 and 62 toward the right on the sleeve and collar means 50, from the position shown in Figure 6, toward the position shown in Figure 7, and permits the belts 22 and 22—A to move inwardly toward the center line of the shaft 14 and forces the V-belts 24 and 24—A outwardly from said center line. This change in the position of these belts of course causes the belts 22 and 22—A to move slower and the belts 24 and 24—A to move faster at any given speed of the shaft 14. If the motor be moved from the left to the right, the conditions of course are reversed and the belts 22 and 22—A will move faster, and the belts 24 and 24—A will move slower.

The R. P. M. of the shafts 16 and 18 are, of course, determined by the effective diameters of the pulleys 80 and 82 and the speed of their driven belts. It is, therefore, obvious that the relative speeds of the shafts 16 and 18 may be substantially varied and that when the motor shaft 14 is positioned directly beneath the shaft 16 that the shaft 16 is rotating at its fastest speed, and the shaft 18 is rotating at its slowest speed. Of course, when the shaft 14 is moved directly beneath the shaft 18, the conditions are reversed.

The degree of the variation in speed obtained will, of course, be dependent upon the details of the construction of the pulley mechanism 40. If the elements of this mechanism, however, be proportioned to obtain substantially the maximum variation, it is possible to vary the speed of either of the shafts 16 or 18 at least fifty per cent without sacrificing the efficiency of these mechanisms.

Now, referring more particularly to Figure 4, let us assume, for the purpose of analysis, that the shaft 18 is locked, and that the gears 128 and 130 are stationary. Under these conditions the speed and direction of rotation of the power input shaft 16 determine the speed and the direction of the rotation of the power output shaft 100.

Now, let us assume that the rotation of the power input shaft 16 is such as to rotate the power output shaft 100 X R. P. M. in a clockwise direction, as viewed in Figure 4, and the shaft 18 is then unlocked and rotated in such a manner as to revolve the gears 128 and 130 in a counter-clockwise direction at a constantly increasing speed. Under these circumstances it is apparent that the output shaft 100 will revolve in a clockwise direction at a constantly decreasing speed until the shaft 100 ceases to rotate and that the shaft 100 will thereafter rotate at a constantly increasing speed in a counter-clockwise direction until the limitations of the mechanism have been attained.

Now, let us assume, for the purpose of further illustration, that the motor shaft 14 is directly beneath the power input shaft 16, that the sun gear 98 has 12 teeth, that each of the planetary gears 114 and 116 has 18 teeth, that the ring gear 130 has 48 teeth, that the external gear 128 has 60 teeth, that the spur gear 134 has 15 teeth and that the power input shaft 16 is being rotated at 1800 R. P. M. with the shaft 18 locked and the gears 128 and 130 stationary. Under these conditions, the power of the output shaft 100 will rotate 360 R. P. M.

Now, let us assume that the shaft 18 is unlocked and rotated at a speed of 1,400 R. P. M. Under these conditions the output shaft 100 will be rotated at 80 R. P. M. It has been previously stated that when the motor shaft 14 is directed beneath the power input shaft 16 that the shaft 16 is being rotated at its highest speed with any given R. P. M. of the motor shaft. Under the conditions assumed, the shaft 16 is therefore being rotated at its greatest speed.

Now, let us assume that the motor is shifted from directly beneath the shaft 16 to a position directly beneath the shaft 18. In this position the relative speeds of the shafts 16 and 18 are reversed, and we can now assume that the shaft 16 is rotating at a speed of exactly 1,800 R. P. M. Under these conditions, the power output shaft rotates at a speed of 80 R. P. M. in a direction opposite to the direction at which this shaft rotated when the motor shaft 14 was directly under the input power shaft 16.

Now, assuming that the pulleys 80 and 82 are identical and that the motor is shifted inwardly to such a position that the shaft 14 is equidistant from the shafts 16 and 18, the V-belts 22 and 22—A and the V-belts 24 and 24—A will ride in the pulley mechanism 40 at an equal distance from the center line of the shaft 14, and each of these belts will rotate at the same speed and thereby rotate the shafts 16 and 18 at equal R. P. M.

Under these conditions, of course, each of the shafts 16 and 18 will rotate at a speed of 1,600 R. P. M. and the power output shaft 100 will be stationary.

From the above it is apparent that I have disclosed a method of and an apparatus for attaining infinitely variable speeds in an unusually convenient and efficient manner; for instance, the pulley and belt mechanism 40 not only enables one to drive a plurality of shafts from a single driven shaft, but it also provides a means of maintaining the belts in alignment with the driven shafts.

These advantages are made possible by the fact that not only do the rim members 60 and 62 shift longitudinally on the sleeve and the collar means 50, but the means 50 is also shiftable longitudinally with respect to the shaft on which the mechanism 40 is secured.

It is quite apparent that were the sleeve and collar means 50 fixed with relation to the shaft, the shifting of the pulley means would force the V-belts out of alignment with their driven shafts and the transmission 40 would not operate as efficiently.

It is also apparent that the shafts 16 and 18 of the transmission mechanism 20 may be driven, if desired, by separate driving shafts and that these driving shafts may be rotated in opposite directions. Under these conditions, the gears 128 and 130 could, of course, be rotated in the same direction as the power output shaft 100 and much greater forward driving speeds could be obtained.

I also would point out that I have provided means for raising and lowering the motor in such a manner that longer or shorter V-belts may be used and the distance between the driving and the driven shafts may be increased to compensate for worn or stretched belts.

I would also call attention to the fact that the planetary gears are preferably not mounted on studs projecting from a single plate or flange, but that these gears are preferably supported on shafts, each end of which is mounted on opposite plates which are secured together in a very rigid manner. This construction enables the mechanism 20 to provide a much greater driving torque than would otherwise be possible, and also renders the mechanism far less likely to break down or fail to operate when the power output shaft is suddenly stopped.

Figure 10:
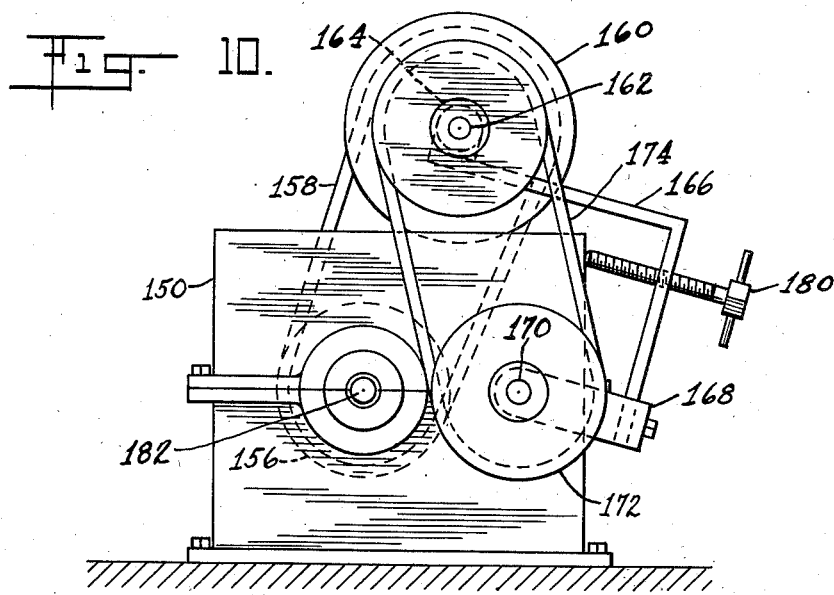
Figure 10 is an end elevational view of the same.

In Figures 9 and 10 I have shown a modified form of my invention which is particularly designed to be made in small units of the type which may be directly coupled to small motors or other driving means.

This modified form is provided with a casing 150 within which is mounted a gear train which is similar to and may be identical with the gear train of the preferred form of my invention.

Operatively secured to the casing 150 is a power input shaft 152 carrying at its inner end the sun gear of the gear train of this modified form. This power input shaft is directly coupled to and in alignment with a drive shaft of any suitable motor 154 and it carries intermediate of the motor and the casing a preferably flat pulley 156. A belt 158, which is preferably flat and thick in proportion to its width operatively connects the power input shaft with a spring pressed split pulley cone means 160. This pulley means is mounted on a shaft 162 and may be constructed substantially as shown or in any suitable manner known to the art. The shaft 162 is rotatably mounted on a tubular bearing member 164 which is welded or otherwise fixedly secured to an L-shaped plate or arm 166 having a U-shaped bracket 168. This bracket is pivotally mounted in any suitable manner on a speed control shaft 170 which projects beyond either side of the housing 152 and carries an integral spur gear operatively connected to the ring gear of the gear train of the transmission.

A pulley 172 is fixedly secured to the end of this speed control shaft and this pulley is operatively connected by any suitable means, such as a belt 174, to a pulley 176, which is fixedly carried on the end of the shaft 162 which is opposite to the end of this shaft carrying pulley cone means 160.

When the cone pulley means is raised, the belt 158, of course, moves inwardly and reduces the speed of the shaft 162 which is coupled by the belt 164 and the pulleys 172 and 176 to the speed control shaft 170. Moving inwardly the belt 158 reduces the R. P. M. of the speed control shaft and its integral spur, thereby increasing the speed of the power output shaft 182 of the gear train.

When the control screw 180 is moved inwardly, the operations are of course reversed, and the speed of the power output shaft 182 of course is increased.

It will be noted that in so far as has been shown in the accompanying drawings, both in the preferred and the modified forms, the power input shaft and the speed control shaft rotate in the same direction, and that for this reason relatively increasing the speed of the control shaft reduces the speed of the power output shaft. However, it is obvious, of course, that, by merely crossing one of the driving belts, the control shaft may be rotated in a direction opposite to the direction of rotation of the power input shaft, and that under these circumstances relatively increasing the speed of the control shaft with respect to the speed of the power shaft will increase the R. P. M. of the power shaft.

From the foregoing it will be understood that mechanisms have been provided realizing the objects and advantages hereinbefore set forth and that departures may be made from the exact structures shown and described without departing from scope of my invention; for instance it is obvious that by enlarging the casing and increasing the width of the internal gear ring 130 (see Figure 5) that the external gear ring may be dispensed with and the spur gear 134 may be brought in meshed relationship with the internal ring gear. It is also obvious that the fixed sleeve and collar member 40 (see Figures 6 and 7) may be dispensed with provided an end portion of driving shaft 14 be adapted to slidably receive the sleeve and collar member 54 in a manner adapted to prevent the rotation of the member 54 around the power drive shaft.

I claim:

1. In combination, a variable speed drive mechanism, a slidably mounted, self-aligning variable speed pulley mechanism adapted to be provided with a plurality of V-belts for driving said speed drive mechanism, a main driving shaft operatively connected to said pulley mechanism, a slidably mounted support for said main driving shaft, including means whereby said driving shaft and said pulley mechanism may be moved with respect to said drive mechanism, and a pivotally mounted base for said support whereby said pulley mechanism may be pivotally moved to and from said drive mechanism.

2. In combination, a variable speed drive mechanism, a slidably mounted, self-aligning variable speed pulley mechanism adapted to be provided with a plurality of V-belts for driving said speed drive mechanism, a main driving shaft operatively connected to said pulley mechanism, a slidably mounted support for said main driving shaft, including means whereby said driving shaft and said pulley mechanism may be moved with respect to said drive mechanism, and a pivotally mounted base for said support whereby said pulley mechanism may be pivotally moved to and from said drive mechanism, said variable speed drive mechanism including an enclosed stationary housing, a power input shaft having a sun gear, within said housing, a rotatable ring member within said housing having a fixedly secured outer ring gear and an internal ring gear rigidly connected to said ring member, a speed control shaft carrying a gear within said housing rigidly connected to said speed control shaft and in meshed relation with said outer ring gear, and a power output shaft in alignment with said power input shaft and carrying a plurality of spaced apart rotatably mounted gears in meshed relationship with said sun gear and said internal gear.

3. In combination, a variable speed drive mechanism, a slidably mounted, self-aligning variable speed pulley mechanism adapted to be provided with a plurality of V-belts for driving said speed drive mechanism, a main driving shaft operatively connected to said pulley mechanism, a slidably mounted support for said main driving shaft, including means whereby said driving shaft and said pulley mechanism may be moved with respect to said drive mechanism, and a pivotally mounted boss for said support whereby said pulley mechanism may be pivotally moved to and from said drive mechanism, said variable speed drive mechanism including an enclosed stationary housing, a power input shaft having a sun gear, within said housing, a rotatable ring member within said housing having a fixedly secured outer ring gear and an internal ring gear rigidly connected to said ring member, a speed control shaft carrying a gear within said housing rigidly connected to said speed control shaft and in meshed relation with said outer ring gear, and a power output shaft in alignment with said power input shaft and carrying a plurality of spaced apart rotatably mounted gears in meshed relationship with said sun gear and said internal gear, the longitudinal center lines of said power input shaft and said power output shaft being spaced apart from but parallel to the longitudinal center line of said speed control shaft.

4. In combination, a variable speed drive mechanism, a slidably mounted, self-aligning variable speed pulley mechanism adapted to be provided with a plurality of V-belts for driving said speed drive mechanism, a main driving shaft means operatively connected to said pulley mechanism, a slidably mounted support for said main driving shaft, including means whereby said driving shaft and said pulley mechanism may be moved with respect to said drive mechanism, and a pivotally mounted base for said support whereby said pulley mechanism may be pivotally raised and lowered with respect to said drive mechanism, said variable speed drive mechanism including an enclosed stationary housing, a power input shaft adapted to be driven by a V-belt on said pulley mechanism and having a sun gear rigidly connected thereto, a rotatable ring member within said housing having an outer ring gear and an internal ring gear rigidly connected to said ring member, a speed control shaft adapted to be driven by a V-belt on said pulley mechanism and carrying a gear within said casing rigidly connected to said speed control shaft and in meshed relation with said outer ring gear, and a power output shaft in alignment with said power input shaft and carrying a plurality of spaced apart rotatably mounted gears in meshed relationship with said sun gear and said internal gear, said variable speed pulley mechanism including a sleeve and collar member fixedly secured to said main driving shaft and a sleeve and collar means slidably mounted on said sleeve and collar member, said collar means carrying intermediate of its outer portions a fixedly secured rim member and also carrying a plurality of slidably mounted rim members intermediate of said fixedly secured member and said outer portion of said sleeve and collar means.

5. In combination, a variable speed drive mechanism, a slidably mounted, self-aligning variable speed pulley mechanism adapted to be provided with a plurality of V-belts for driving said speed drive mechanism, a main driving shaft means operatively connected to said pulley mechanism, a slidably mounted support for said main driving shaft, including means whereby said driving shaft and said pulley mechanism may be moved with respect to said drive mechanism, and a pivotally mounted base for said support whereby said pulley mechanism may be pivotally raised and lowered with respect to said drive mechanism, said variable speed drive mechanism including an enclosed stationary housing, a power input shaft adapted to be driven by a V-belt on said pulley mechanism and having a sun gear rigidly connected thereto, a rotatable ring member within said housing having an outer ring gear and an internal ring gear rigidly connected to said ring member, a speed control shaft adapted to be driven by a V-belt on said pulley mechanism and carrying a gear within said housing rigidly connected to said speed control shaft and in meshed relation with said outer ring gear, and a power output shaft in alignment with said power input shaft and carrying a plurality of spaced apart rotatably mounted gears in meshed relationship with said sun gear and said internal gear, said variable speed pulley mechanism including a sleeve and collar member fixedly secured to said main driving shaft and a sleeve and collar means slidably mounted on said sleeve and collar member, said collar means carrying intermediate of its outer portions a fixedly secured rim member and also carrying a plurality of slidably mounted rim members intermediate of said fixedly secured member and said outer portion of said sleeve and collar means, said pulley mechanism being also provided with a rod or bolt rotatably slidably positioned within the collar portion of said sleeve and collar member and being rigidly secured to said sleeve and collar means.

6. In combination, a variable speed drive mechanism, a slidably mounted, self-aligning variable speed pulley mechanism adapted to be provided with a plurality of V-belts for driving said speed drive mechanism, a main driving shaft means operatively connected to said pulley mechanism, a slidably mounted support for said main driving shaft, including means whereby said driving shaft and said pulley mechanism may be moved with respect to said drive mechanism, and a pivotally mounted base for said support whereby said pulley mechanism may be pivotally raised and lowered with respect to said drive mechanism, said variable speed drive mechanism including an enclosed stationary housing, a power input shaft adapted to be driven by a V-belt on said pulley mechanism and having a sun gear rigidly connected thereto, a rotatable ring member within said housing having an outer ring gear and an internal ring gear rigidly connected to said ring member, a speed control shaft adapted to be driven by a V-belt on said pulley mechanism and carrying a gear within said housing rigidly connected to said speed control shaft and in meshed relation with said outer ring gear, and a power output shaft in alignment with said power input shaft and carrying a plurality of spaced apart rotatably mounted gears in meshed relationship with said sun gear and said internal gear, said variable speed pulley mechanism including a sleeve and collar member fixedly secured to said main driving shaft and a sleeve and collar means slidably mounted on said sleeve and collar member, said collar means carrying intermediate of its outer portions a fixedly secured rim member and also carrying a plurality of slidably mounted rim members intermediate of said fixedly secured member and said outer portion of said sleeve and collar means, said pulley mechanism being also provided with a rod or bolt rotatably slidably positioned within the collar portion of said sleeve and collar member and being rigidly secured to said sleeve and collar means, each of said spaced apart rotatably mounted gears on said input power shaft means being provided with shafts and being rotatably mounted thereon, said power input shaft means having at its inner end a fixedly secured hollow circular housing provided with recessed portions adapted to receive the end portions of each of said shafts of said spaced apart rotatably mounted gears.

DANIEL C. DRILL.